US005095605A

United States Patent [19]

Tonus

[11] Patent Number: 5,095,605

[45] Date of Patent: Mar. 17, 1992

[54] METHOD FOR MAKING PALLETS

[76] Inventor: Egidio L. Tonus, 10904 Oak St., Castroville, Calif. 95012

[21] Appl. No.: 614,370

[22] Filed: Nov. 16, 1990

Related U.S. Application Data

[62] Division of Ser. No. 403,413, Sep. 6, 1989.

[51] Int. Cl.[5] ............................................ B23P 11/00

[52] U.S. Cl. ...................................... 29/432; 29/798; 29/464; 227/7; 227/152; 269/37

[58] Field of Search ................. 29/429, 432, 445, 464, 29/467, 798; 227/30, 45, 50, 99, 100, 101, 105, 106, 152, 110, 111; 269/37, 41, 42, 43

[56] References Cited

U.S. PATENT DOCUMENTS

| | | | |
|---|---|---|---|
| 3,207,403 | 9/1965 | Stoddard | 227/101 |
| 3,228,580 | 1/1966 | Washington et al. | 227/101 |
| 3,968,560 | 7/1976 | Vial | 29/430 |
| 4,039,111 | 8/1977 | Rogers | 227/101 |
| 4,054,236 | 10/1977 | Paxton | 227/45 |
| 4,204,624 | 5/1980 | Gunn | 227/45 |
| 4,392,600 | 7/1983 | Billett | 227/50 |
| 4,403,388 | 9/1983 | Belcher | 29/432 X |
| 4,467,951 | 8/1984 | Pagano | 227/48 |
| 4,489,874 | 12/1984 | Worst | 227/7 |
| 4,492,016 | 1/1985 | Smets | 29/432 |
| 4,793,540 | 12/1988 | Mangan et al. | 29/798 X |
| 4,824,004 | 4/1989 | Hanson | 29/798 X |
| 4,967,948 | 11/1990 | Allspaw | 227/152 |

OTHER PUBLICATIONS

Brochure entitled "Senstar Pallet System", for Senco Fastening Systems, ©1989 by Senco Products, Inc. (2 pages).

*Primary Examiner*—Joseph M. Gorski
*Assistant Examiner*—S. Thomas Hughes
*Attorney, Agent, or Firm*—Townsend and Townsend

[57] ABSTRACT

The machine of the present invention operates to automatically nail a combination of pre-cut wood boards together to form a pallet. The machine may be adjusted so that the size of the pallet can be varied as to dimensions and number of pre-cut boards. Once the pallet size and board combination has been selected, the machine is set up by moving jigs, stops, clamps and nailing heads into their proper operative positions. A number of nailing heads are adjustably mounted on a carriage that moves past a support on which the pre-cut boards are mounted. Both the top and bottom boards of the pallet are nailed simultaneously to the central or longitudinal board of the pallet. By way of a clamping system, the boards are squared and precisely positioned and secured together by clamping action. The carriage then begins to move and the nailing operations commence and continue until all of the nails have been driven into the boards of the pallet. The number of nails per board may be variable by adjusting either the speed of travel of the carriage and the cycle time of the nailing heads. Upon completion of the nailing cycle, the pallet is removed automatically and deposited onto a conveyor which conveys the pallet to a stacker which automatically stacks pallets.

12 Claims, 5 Drawing Sheets

METHOD FOR MAKING PALLETS

This application is a division of Ser. No. 403,413, filed Sept. 6, 1989.

This invention relates to improvements in making pallets for use in supporting cartons, boxes and other containers for goods and, more particularly, to a machine and method for making wood pallets in a simplified manner.

BACKGROUND OF THE INVENTION

Machines for making wood pallets have been known and used in the past. For the most part, these machines are generally bulky and large, are complex in construction and operation, and require almost constant maintenance to continue operation. Because they are of large size, they cannot be easily moved and are essentially stationary. Due to these drawbacks, a need has existed for a simplified machine and method for making pallets to minimize production costs while keeping the maintenance of the machine at a minimum. The present invention satisfied this need.

Prior U.S. patents relating to pallet making machines include the following:

| | | |
|---|---|---|
| 3,207,403 | 4,054,236 | 4,403,388 |
| 3,968,560 | 4,204,624 | 4,489,874 |
| 4,039,111 | 4,392,600 | 4,492,016 |

SUMMARY OF THE INVENTION

The machine of the present invention operates to automatically nail a combination of pre-cut wood boards together to form a pallet which can be used for the storage or transportation of goods in boxes, cartons or the like. The machine may be adjusted so that the size of the pallet to be made can be varied as to dimensions and number of pre-cut boards. Once the pallet size and board combination has been selected, the machine is set up by moving jigs, stops, clamps and nailing heads into their proper operative positions.

A number of nailing heads are adjustably mounted on a carriage that moves past a support on which the precut boards are mounted. The heads are movable along paths above and below the support. Both the top and bottom boards of the pallet are nailed simultaneously to the central or longitudinal boards of the pallet. To save time and to increase production rate of the machine, the distance of travel of the nailing heads is limited so that the carriage may be returned to its starting position immediately after the last nails have been fired or driven into the pallet boards. For example, when changing from a pallet requiring 48″ of travel to one requiring only 30″ of travel, the carriage travel distance may be shortened by 18″, thus saving considerable time and substantially increasing the production rate.

Once the jigs, stops, nail centers and carriage travel distance have been set, the machine is ready to begin operation. By means of a clamping system, the boards are squared and precisely positioned and releasably secured together by a clamping action. The carriage begins to move and the nailing operations commence and continue until nails have been driven into all of the boards to be interconnected. The number of nails per board may be varied by adjusting either the speed of travel of the carriage and the cycle time of the nailing heads. Firing of a nailing head is done when the head comes in contact with a board. A sensing device is used to sense both the leading and trailing edges of the board. Sensing of the leading edge of a board begins the nail firing and sensing of the trailing edge of the board stops the nail firing.

Upon completion of the nailing cycle, the carriage is returned rapidly to its starting position. The clamping mechanism is retracted and the pallet is lifted off the support and moved automatically onto a conveyor which conveys the finished pallet to a stacker which automatically stacks the pallet in predetermined numbers. The stack is then released and conveyed onto a gravity conveyor and removed by means of a forklift.

Sequential control of all functions of the machine can be controlled by means of an air logic system. However, these functions may also be controlled electrically by means of relays, contacts, etc., or by a microprocessor or any combination of these components. Also, any predetermined number of nails per board may be provided by limiting the number of nail firings. For instance, if no more then two nails per nailing head per board are desired, control can be altered so that only two firings occur and no more until the sensor is reset.

The machine of this invention can be made relatively small in size so that it can be moved from place to place, such as by a forklift. For instance, it can be 5′ wide and 18′ long. Thus, the machine can be moved to a location at which pallets are to be used, and pallets can be made by the machine at such locations, thus avoiding the need to make the pallets at some remote manufacturing site.

The primary object of the present invention is to provide a machine and method for making pallets wherein the machine has components which can be adjusted to vary the size of the pallet and the number of boards in the pallet and the machine of the present invention can make a large number of pallets in a minimum time at minimum cost to thereby provide an advance over pallet making machines of conventional construction.

Other objects of the present invention will become apparent as the following specification progresses, reference being had to the accompanying drawings for an illustration of the invention.

IN THE DRAWINGS

DETAILED DESCRIPTION OF THE PREFERRED EMBODIMENT

Figure 4:
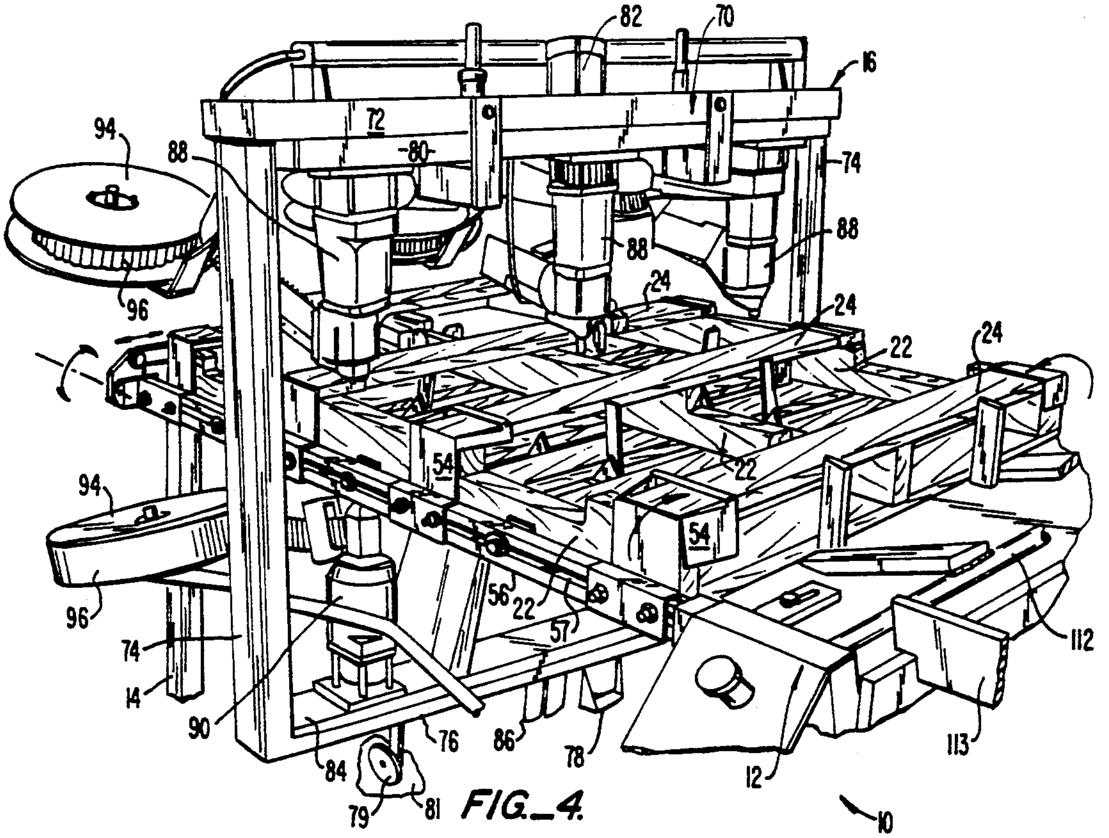
FIG. 4 is a view similar to FIGS. 2 and 3 but showing the machine looking from a different angle from FIGS. 2 and 3 and with the boards clamped in place and the nailing operation commenced.

The pallet making machine of the present invention is broadly denoted by the numeral 10 and includes a table or support 12 adapted to be mounted on a floor by legs 14, only one of which is shown in FIG. 4. Table 12 is adapted to support a plurality of pre-cut wood boards in an arrangement such that the boards form the pallet to be made. After the boards are manually placed on the table or support 12, a plurality of nailing heads are moved by a carriage 16 past the table above and below the table for nailing the boards together to form a pallet broadly denoted by the numeral 18 and show in its completed form in FIG. 10. Another view of the pallet which can be formed by the operation of the machine of the present invention is shown in FIG. 12 and indicates possible nail positions on the boards of the pallet.

Figure 10A:
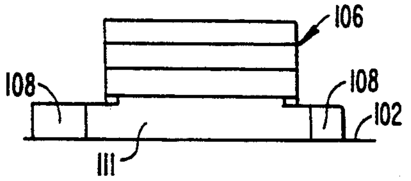
FIG. 10A is a schematic view of a stack of pallets made with the machine of the present invention.
Figure 10:
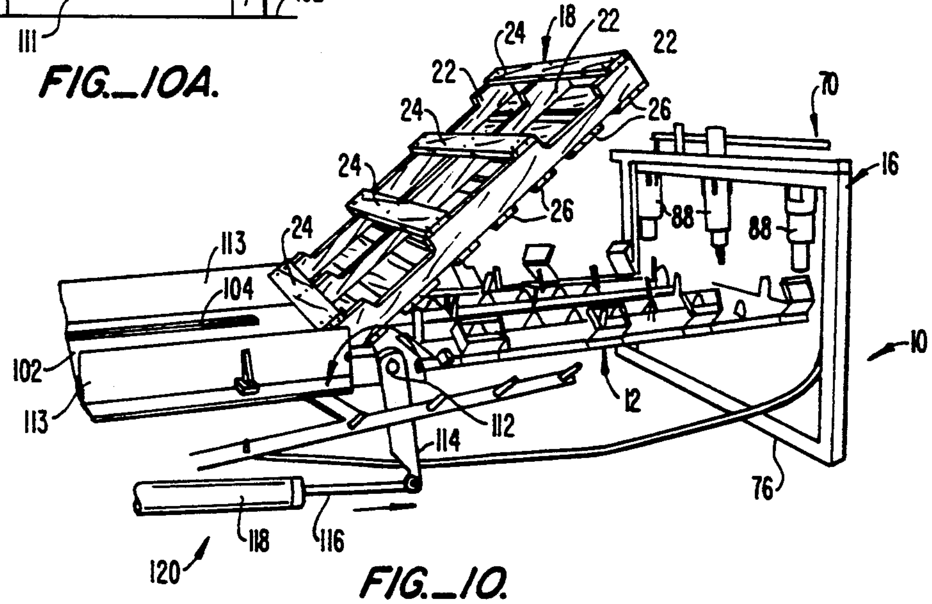
FIG. 10 is a perspective view of the machine showing the way in which a finished pallet is lifted off the support and inverted for placement on a conveyor for travel to the bottom of a stack of pallets.

The pallet 18 has a conventional configuration and is comprised of a number of central or longitudinal boards, typically three in number, denoted by the numeral 22 and shown in FIG. 10. The pallet 18 has upper and lower cross boards which can vary in number, depending upon the desired size of the pallet to be made. For purposes of illustration, FIG. 10 shows upper boards 24 which are four in number. While these boards 24 are at the upper part of the pallet when the pallet is being made by machine 10; boards 24 will be the bottom boards of the pallet when the pallet is in use. Again for purposes of illustration, pallet 18 has seven lower boards 26 secured to the bottom faces of longitudinal boards 22.

Figure 12:
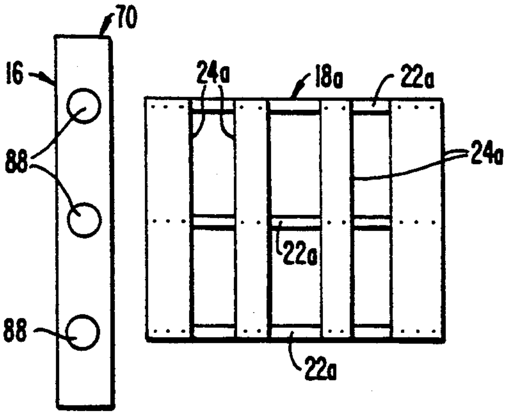
FIG. 12 is a top plan view of a pallet showing the frame carrying the nailing heads in schematic form to illustrate the number of nails in the ends and center portions of each board of the pallet.

Another embodiment of the pallet is shown in FIG. 12 and is denoted by the numeral **18*a*. It has three longitudinal boards 22*a* and four upper boards 24*a*. The lower boards are not shown in FIG. 12 to simplify the drawing. FIG. 12 also shows the nail connecting boards 24*a* with boards 22*a*. The end boards 24*a* are wider than the intermediate boards 24*a* and are coupled by three nails to adjacent longitudinal boards 22*a*. The intermediate boards 24*a* are coupled by two nails to the adjacent boards 22*a***. The nailing pattern can be varied if desired.

Figure 1:
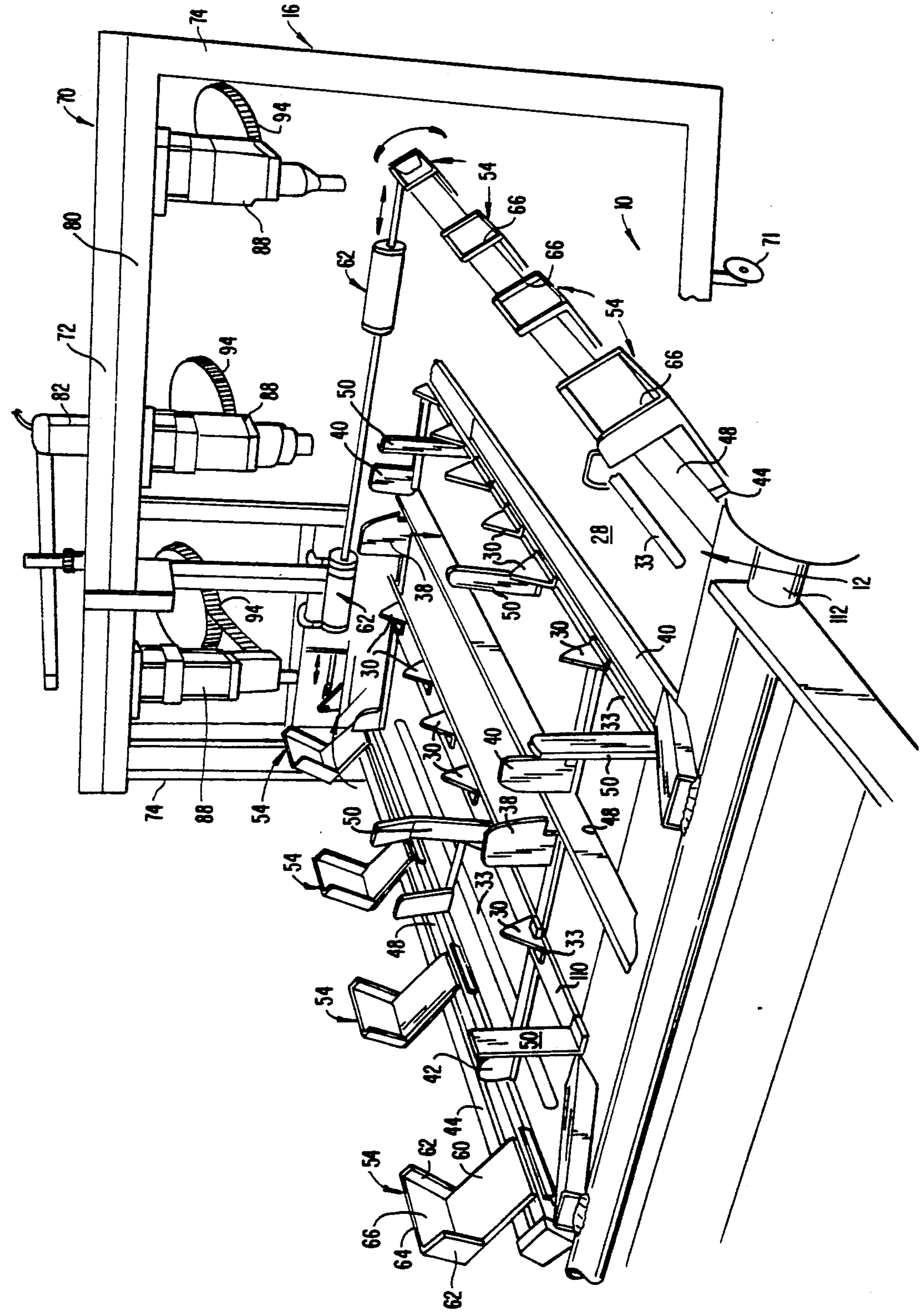
FIG. 1 is a fragmentary, perspective view of the pallet making machine of the present invention.

Table or support 12 shown in FIG. 1 is comprised of a plate 28 which typically is of metal and which is positioned such that the plate forms a generally horizontal surface provided with slots and grooves for mounting jigs, guides and stops for positioning the boards 22, 24 and 26 (FIG. 10) relative to each other.

Figure 8:
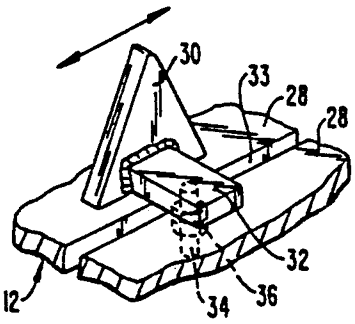
FIG. 8 is an enlarged, perspective view of a board stop on the support of the present invention.

A plurality of triangularly shaped guides 30 are mounted in aligned locations on support 12 and the alignment of the guides 30 is achieved by mounting the guides in slots 33 extending longitudinally of the direction of travel of carriage 16. There are a total of four slots 33 in the plate 28 as shown in FIG. 1. The guides 30 are adjustable in position in the manner shown in FIG. 8 because the guides 30 have a side projection 32 welded thereto and presenting a base for a bolt 34 passing through the adjacent slot 33 between a pair of plates 28. A nut 36 threaded onto bolt 34 adjustably holds the corresponding guide 30 at the desired location. Guides 30 are adapted to position lower boards 26 at desired locations on the upper surface of support 12.

Figure 9:
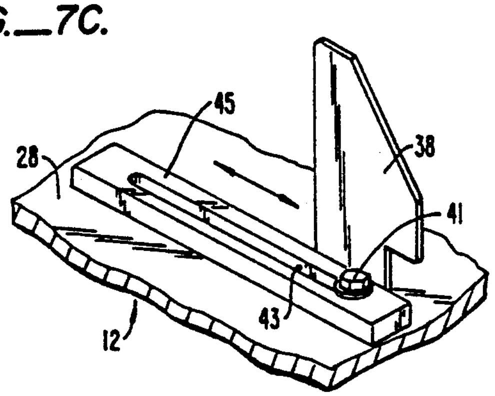
FIG. 9 is a view similar to FIG. 8 but showing another type of stop for a board for making a pallet using the machine of the present invention.

FIG. 9 shows how guide 30 is adjustably mounted on support 12. A bar 45 having a slot 43 is secured to guide 38 and adjustably mounted by bolt 41 on support 12.

To position the centrally disposed longitudinal board 22 (FIG. 10), a pair of guides 38 and 40 are provided on the upper surface of support 12 at two locations as shown in FIG. 1. The locations for the side longitudinal boards 22 are determined by side guides 42 (FIG. 1) and a side rail 44 forming part of a clamp means 46 hereinafter described. Longitudinal slots 48 are provided at the central location of support 12 and at side locations of support 12 as shown in FIG. 1. These slots are to expose the portions of the lower boards 26 to the nailing machines on carriage 16 in the manner hereinafter described.

Figure 2:
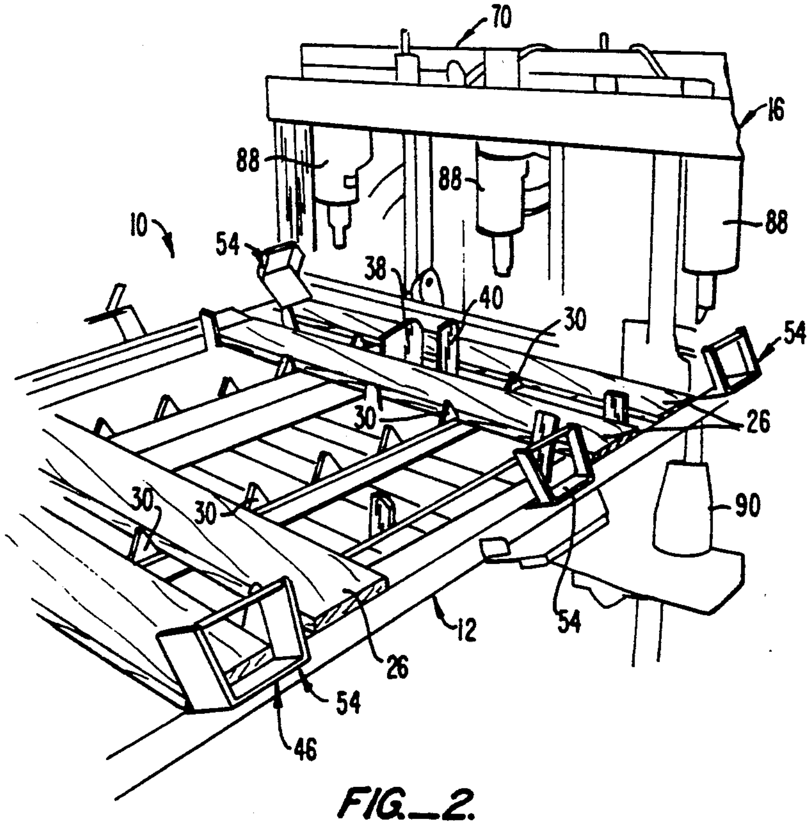
FIG. 2 is a view similar to FIG. 1 but showing the machine after the lower cross boards of a pallet to be made have been placed on the machine prior to the nailing operation.
Figure 3:
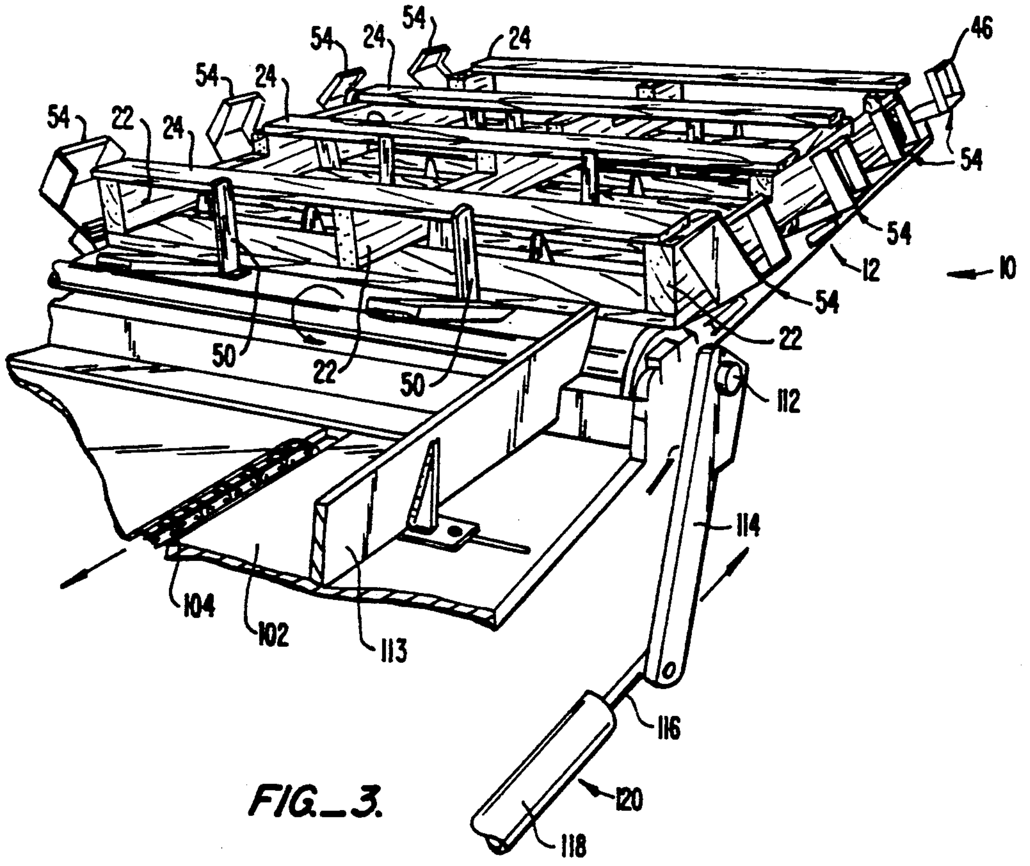
FIG. 3 is a view similar to FIG. 2 but showing all boards of the pallet to be made being in place prior to the nailing operation.

Finally, guides 50 are adjustably mounted on support 12 and extend upwardly from the upper surface thereof as shown in FIG. 1. These upper guides 50 position upper boards 24 on central boards 22 to complete the placement of the boards 22, 24 and 26 to form the pallet before the pallet boards are nailed together. FIG. 2 shows three bottom boards 26 in place and oriented by the adjacent guides 30 and before the longitudinal boards 22 are placed on boards 26. There may be more or fewer boards 26 than those shown in FIG. 2; however, typically there are at least three lower boards 26 and sometimes as many as eight or ten. FIG. 2 shows that each board 26 is held in place by the adjacent guides 30 so that boards 26 are perpendicular to the path of travel of carriage 16 and extend between rails 44 on which clamp means 46 are mounted. FIG. 3 shows the longitudinal boards 22 mounted on the bottom boards 26 and oriented by guides 38, 40 and 42. FIG. 2 further shows that the location of the upper boards 24 which are in engagement with the adjacent upright edges of guides 50 such that there are four upper boards 24 resting on the adjacent upper faces of longitudinal boards 22. The clamp means 46 (hereinafter described) is shown in FIG. 1 in an open condition at each side of the table or support 12.

Clamp means 46 is provided for each side, respectively, of support 12. Clamp means 46 includes a clamp member 54 for each end, respectively, of a top board 24. Thus, for four top boards 24 in the pallet shown in FIG. 3, there are four clamp members 54 at each side, respectively, of the support 12. The four clamp members are carried by a side rail 56 (FIG. 7A and 7B) with rail 56 being coupled by pin means 58 to support 12 for rotation of the clamp member 54 from a retracted position shown in FIG. 7A to an operative, clamping position shown in FIG. 7B.

Each clamp member 54 includes a plate 60 (FIGS. 1, 7A and 7B) which is rigidly secured to and extends outwardly from the corresponding rail 56. A pair of sides 62 extends laterally from the outer end of plate 60 at the sides thereof and a crosspiece 64 couples the outer end of sides 62 as shown in FIG. 1. Thus, the central portions 66 (FIG. 1) of each clamp member 54 is open to expose the corresponding upper board 24 to the nailing head hereinafter described as the nailing head moves relative to and along support 12 above and below the latter.

Figure 6:
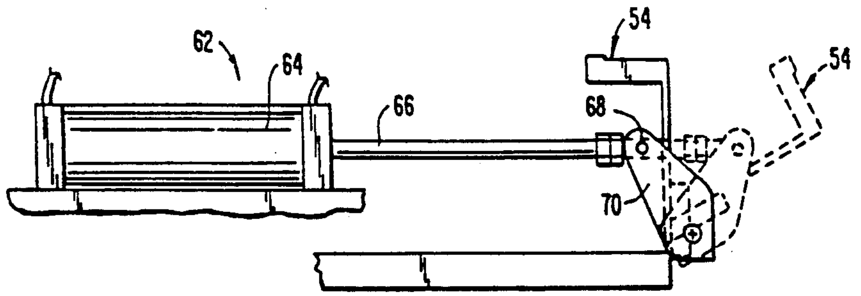
FIG. 6 is an enlarged, side elevational view of a board clamp and the means for moving the clamp from a retracted position to an operative position.
Figure 7A:
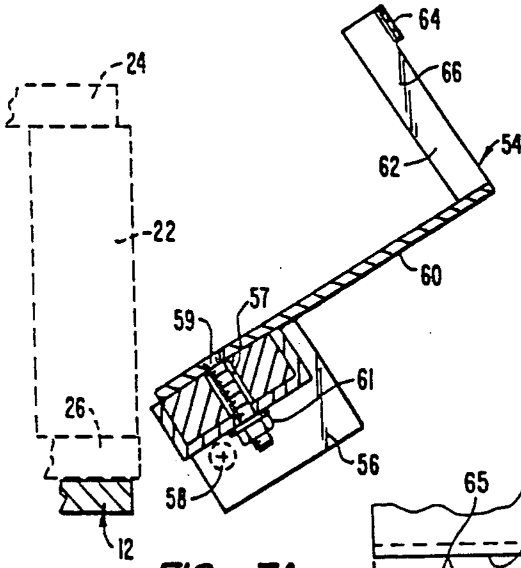
FIG. 7A is view similar to FIG. 6 but showing the clamp about to be moved into clamping relationship with the adjacent board which are out of alignment with each other.
Figure 7B:
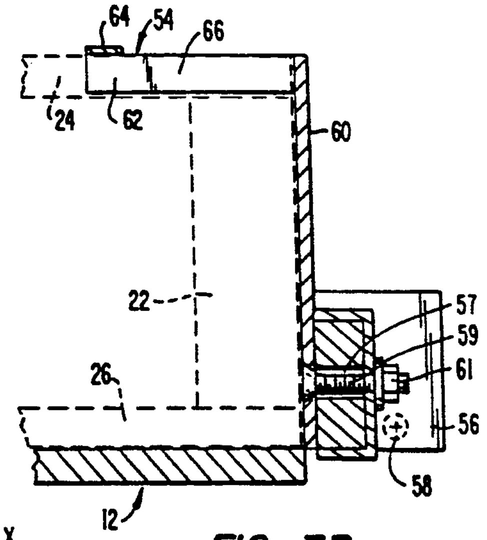
FIG. 7B is a view similar to FIG. 7A but showing the clamp in place and the boards in alignment with each other by virtue of the presence of the clamp.

Means for rotating each rail 56 includes a fluid piston and cylinder assembly 62 (FIG. 6) including a cylinder 64 and a piston rod 66 projecting outwardly from the cylinder, the outer end of the piston being coupled to an outer end 68 of an arm 70 rigid to pivot pin means 58 (FIGS. 7A and 7B). FIG. 6 shows the operative position of the corresponding clamp member 54 (in full lines) and the retracted position of the clamping member 54 (in dashed lines). FIGS. 7A and 7B also show that clamp members 54 properly align longitudinal boards 22 with upper and lower boards 24 and 26. FIG. 7A shows the boards out of specific alignment with each other and FIG. 7B shows the board properly aligned at their extremities.

Rails 56 can be adjustably mounted on support 12 to move laterally. Thus, the width of the pallet to be made by machine 10 can be varied. FIGS. 4, 7A and 7B show the way in which clamp members 54 are adjustable along the specific rail 56. The rail is shown with a slot 57 extending thereinto and a nut 61 carried by the rail is threaded to bolt 59 which adjustably secures the base of the clamp member 54 to rail 56 as shown in FIG. 4. In this way, two or more clamp members 54 can be provided, the clamp members being removably mounted on the rail so that not only can the spacing between clamp members 54 be adjustable, but also the number of clamp members 54 can be selected to accommodate the size of the pallet to be made by the machine 10 of the present invention.

Figure 7C:
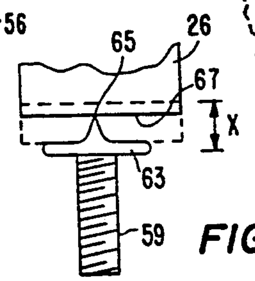
FIG. 7C is a side elevational view of a bolt showing a head on the bolt for engaging a pallet board to align the board properly in the event that the board length is not standard.

Each bolt 59 can be provided with a head 63 (FIG. 7C) with the head being provided with an edge 65 for engaging the end 67 of a lower board 26. Thus, the bolt and its head 63 will compensate for variations in the length of board 26 from a standard length as indicated by the letter "x" (FIG. 7C). Thus, when clamp member 54 pivots from the position shown in FIG. 7A to the position shown in FIG. 7B, edge 65 will engage end 67 of board 26 to position the board properly for nailing in the event that the board end 67 falls in the range identified by "x". Similarly, each guide 30 (FIG. 8) can be provided with a lower inclined edge 69 to compensate for variations in width of a board 26.

Carriage 16 (FIGS. 1 and 4) includes a rectangular frame 70 having an upper crosspiece 72, a pair of sides 74 extending downwardly from the outer ends of crosspiece 72, and a lower crosspiece 76 extending between and coupled to the lower ends of sides 74. Frame 70 moves as a unit past support 12 under the influence of a moving means 78 (FIG. 4) which preferably is in the form of a fluid piston and cylinder assembly below support 12. Thus, frame 70 is movable with the sides 74 always the same distance from the side rails 56 of support 12 and crosspieces 72 and 76 always the same distances above and below the upper surface of support 12.

Upper crosspiece 72 carries a channel member 80 for up and down movement with respect thereto. A fluid piston and cylinder assembly 82 is carried by crosspiece 72 for moving channel member 80 downwardly and upwardly relative to crosspiece 72. Similar bottom crosspiece 76 has a channel member 84 (FIG. 4) for movement upwardly and downwardly under the influence of a fluid piston and cylinder assembly 86.

Three nailing heads 88 are adjustably mounted on crosspiece channel member 80 as shown in FIG. 4. Similarly, three nailing heads 90 are carried by channel member 84, only one of the nailing heads 90 being shown on FIG. 4 but it is to be understood that there are two additional nailing heads 90 which are aligned with corresponding nailing heads 88 above support 12.

The nailing machines are carried by carriage 16 past the pallet boards assembled in the manner shown in FIG. 4 when the boards are clamped together by clamp members 54 and the boards are nailed together to form the completed pallet 18. The nailing heads 90 are adjustable lengthwise of the respective channel members 84; similarly nailing heads 88 are adjustable lengthwise of channel member 80. Thus, the nailing heads can be adjusted to accommodate pallets of different widths.

The nailing heads 88 and 90 are identical with each other and are commercially available items. A typical nailing head is one made by Bostitch, Inc., Model N70.

Figure 5:
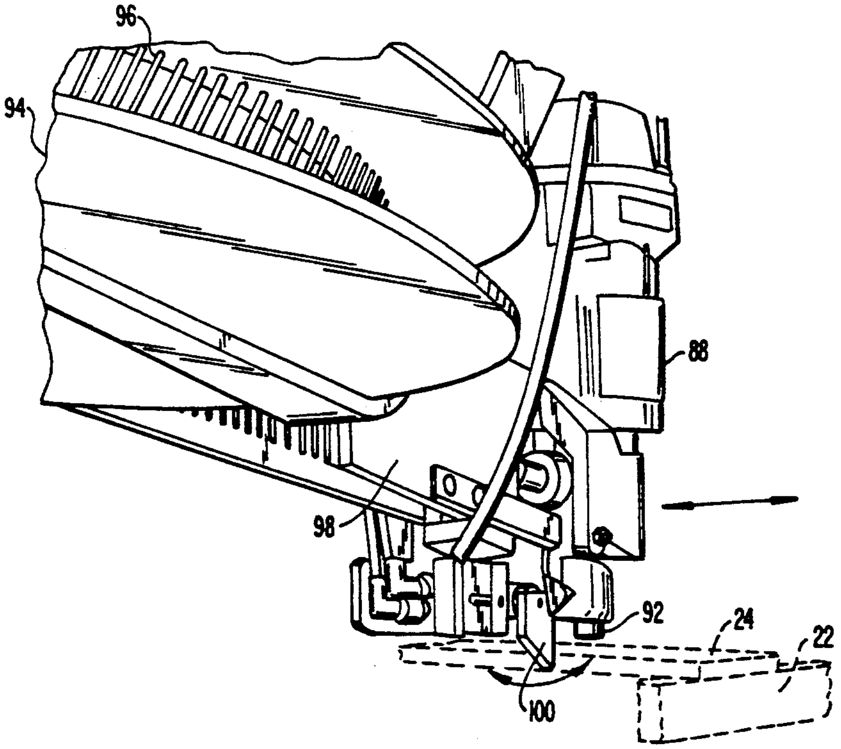
FIG. 5 is an enlarged, fragmentary perspective view of the nailing head of the machine of FIGS. 1–4.

The nailing head has a nail dispenser 92 (FIG. 5) through which nails are forcibly driven from the nailing head into the adjacent board for forming the pallet 18. A magazine 94 containing nails 96 is carried by means 98 on the nailing head 88 or 90 so that nails can be fed one by one to the nail dispenser 92 and fired or forced into the adjacent pallet board for connecting the boards together.

Nailing head 88 or 90 has a pivotal sensor member 100 (FIG. 5) which senses the leading and trailing edges of each upper board 24. When the leading edge of the board is sensed by pivoting action of sensor member 100, a limit switch is triggered which causes a signal to be sent to a timer which triggers the nailing head and causes a nail to be driven from dispenser 92 into the adjacent pallet boards in a timed sequence As soon as the sensor member 100 moves off the board or senses a trailing edge of the board, the timing sequence stops. In this way, the width of the board determines the number of the nails to be driven into the board. For instance, as shown in FIG. 12, board *24a* is relatively wide; thus, each nailing head drives three nails into board *24a* at each of three locations thereon. The intermediate boards 24 are relatively narrow and are wide enough to accommodate only two nails driven into the board. Thus, the width of the board determines the number of nails to be driven into the board.

As soon as the boards are all nailed by the nailing heads 88 and 90, the carriage 16 is reversed automatically by limit switch means (not shown) and returned to its starting position.

After the pallet has been completed, it is raised upwardly from support 12 and inverted and allowed to fall onto a table extension 102 (FIGS. 3 and 10) and pulled by a powered chain conveyor 104 which forces the pallet after it has been inverted into and beneath a stack 106 of pallets 18 (FIG. 10A). Table extension 102 has adjustable sides 113. A pair of side elevators 108 coupled with the stack elevate the stack to receive the just completed pallet, whereupon the stack is lowered by the elevators onto the latter pallet and awaits the next pallet. The next pallet will be placed on the bottom of the stack after the elevators have moved the stack upwardly once again to form a space 111 for receiving the just completed pallet on the lowest part of the stack.

The means for lifting the just completed pallet upwardly and inverting it includes a pair of spaced, parallel bars 110 carried by support 12 as shown in FIG. 1. Bars 110 are pivotally mounted on a shaft 112 (FIG. 10) near the downstream end of support 12. Shaft 112 is coupled to an arm 114 which is pivotally coupled to the outer end of a piston 116 extending outwardly from a cylinder 118 to a fluid piston and cylinder assembly 120. By actuating assembly 120, shaft 112 is caused to rotate in a counterclockwise sense when viewing FIG. 10, rotating bars 110 in the same direction and elevating the completed pallet as shown in FIG. 10 until the pallet is inverted and falls over and onto coupled relationship with conveyor 104. The conveyor moves a completed pallet between sides 113 (FIGS. 3 and 10) and underneath the stack 106 (FIG. 10A).

Figure 11:
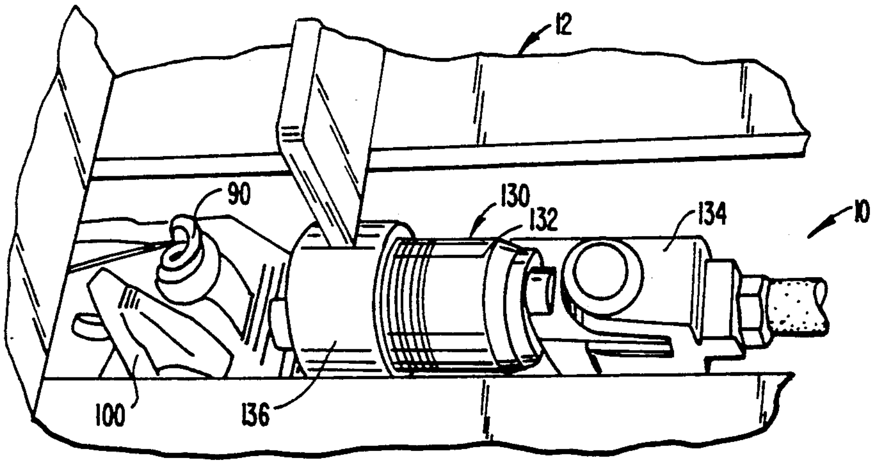
FIG. 11 is an enlarged, fragmentary perspective view of a stop means for the carriage for mounting the nailing heads of the present invention.

In order to achieve faster nailing, a device 130 (FIG. 11) is used to minutely, almost undetectably, stop carriage 16 during each nailing operation. The device comprises a shock absorber 132 mounted between the clevis 134 coupled to the piston rod of assembly 78 and a connector (not shown) for coupling the adjacent end 136 to carriage 16. The shock absorber allows continued movement of the piston rod coupled to clevis 134 as carriage 16 is momentarily stopped as each nailing head 88 or 90 drives a nail in an adjacent board. Thus, the nails are cleanly driven into the boards without splintering or otherwise damaging the board, yet the nail heads can be countersunk into the boards. The shock absorber thus allows the carriage to stop when nails are driven into the pallet boards.

Sequential control of all functions are currently controlled by means of air logic. However, these functions may also be controlled electrically by means of relays, contacts and the like or by microprocessor or any combination of these components. Also, any predetermined number of nails per board may be achieved by limiting the number of nail firings. If no more than two nails per head per board are needed, control can be altered so that only two firings occur and no more until the sensors of the nailing heads reset.

In operation, machine 10 is constructed such that it has stops or guides 30, 38, 40 and 50 in the manner shown in FIG. 1. The carriage 16 will be in its starting position as shown in FIGS. 1, 2 and 10. The stops will all be adjusted for the proper number of boards for making pallet 18.

First, lower boards 26 are manually placed on support 12, such as in the manner shown in FIG. 2 so that the boards are at the proper locations spaced from each other for making the pallet. Then, the longitudinal boards 22 are manually placed on boards 26 in the positions shown in FIG. 3. Finally, upper boards 24 are placed on and span the distance between the outer longitudinal boards 22 as shown in FIG. 3. Then, a switch is triggered which causes rotation of the clamp members 54 from the retracted positions shown in FIGS. 3, 6 and 7A to the operative positions shown in FIGS. 4 and 7B.

A switch is then closed to cause actuation of moving means 78, causing carriage 16 to move from left to right when viewing FIG. 4, carrying the upper nailing heads 88 and the lower nailing heads 90 simultaneously past the mounted boards clamped together in the manner shown in FIG. 4. The nailings will be on respective boards, such as in the pattern shown in FIG. 12 or other pattern if desired.

As soon as the nailings have been completed, carriage 16 is retracted under the influence of moving means 78. As soon as the carriage has been retracted, a switch causes actuation of fluid piston and cylinder assembly 120 (FIG. 10) which rotates bars 110 to elevate the completed pallet 18 in the manner shown in FIG. 10. The pallet is raised sufficiently high to fall over center and onto conveyor 104 where the pallet is moved to a region below stack 106 (FIG. 10A) which is elevated by elevators 108.

As soon as the just completed pallet is beneath the stack, the stack is once more lowered onto the lowest pallet and the pallet stack awaits the next pallet from support 12. As soon as a sufficient number of pallets are formed in stack 106, the stack is dispensed onto a gravity conveyor capable of accumulating a plurality of pallet stacks.

I claim:

1. A method for making a pallet from a number of pre-cut wood boards with the pallet having a pallet shape comprising:

arranging a number of pre-cut wood boards together with the boards including a set of lower boards, a set of intermediate boards and a set of upper boards and with the boards being arranged in the shape of a pallet to be made;

applying individual clamping forces to each end, of respective upper boards, thereby clamping the lower, intermediate and upper boards against movement relative to a predetermined reference; and sequentially nailing the boards together at specific locations thereon as the boards are arranged in the shape of a pallet to be made and as the boards are clamped together.

2. A method as set forth in claim 1, wherein is included the steps of providing a support surface for the boards, and orienting certain of the boards on the surface relative to the remaining boards of the pallets to be made.

3. A method as set forth in claim 1, wherein the support surface has support boundaries engageable with the boards, including the step of adjusting the support boundaries before the orienting step.

4. A method as set forth in claim 1, wherein said arranging step includes placing the lower boards on a support surface, positioning the intermediate boards on the lower boards and placing the upper boards on the intermediate boards.

5. A method as set forth in claim 1, wherein the force applying step includes exerting the clamping forces to the ends of the upper boards simultaneously.

6. A method as set forth in claim 1, wherein a pallet to be made has dimensions and a number of boards, and wherein is included the step of adjusting the dimensions and numbers of the boards, thereby changing the size of the pallet to be made.

7. A method as set forth in claim 1, wherein said nailing step includes moving a nailing head along the length of the pallet to be made of a predetermined speed of travel and performing the nailing step when the nailing head is adjacent to a board to be nailed.

8. A method as set forth in claim 7, wherein is included the step of adjusting the speed of travel of the nailing head relative to the board.

9. A method as set forth in claim 1, wherein is included step of adjusting a rate of nailing changing a rate of production of the pallets.

10. A method as set forth in claim 1, wherein said nailing step includes applying the upper boards at each of a number of locations along the length of the pallet to be made and applying nails to the lower boards at each of said locations, the nail applying steps at each location being performed simultaneously.

11. A method as set forth in claim 1, wherein is included the step of placing completed pallets in a stack.

12. A method as set forth in claim 1, wherein the nailing step includes providing a nailing zone movable into a position adjacent to a board to be nailed, applying a moving force to the nailing zone, thereby moving it from board to board, and stopping the nailing zone for a time interval as the moving force continues to be applied, thereby permitting the driving of a nail into the board when the nailing zone is stopped.

* * * * *